United States Patent [19]
Takeoka et al.

[11] 3,939,097

[45] Feb. 17, 1976

[54] EXHAUST GAS CLEANING CATALYSTS AND METHOD OF PRODUCING SAME

[75] Inventors: So Takeoka, Wako; Hideya Inaba; Masayoshi Ichiki, both of Osaka, all of Japan

[73] Assignee: Hitachi Shipbuilding and Engineering Co., Ltd., Osaka, Japan

[22] Filed: Dec. 6, 1973

[21] Appl. No.: 422,356

[30] Foreign Application Priority Data

Dec. 7, 1972  Japan............................... 47-122955
Dec. 7, 1972  Japan............................... 47-122956

[52] U.S. Cl................ 252/464; 252/465; 252/466 J; 252/466 B; 423/213.2; 423/213.5
[51] Int. Cl.². B01J 21/04; B01J 23/74; B01J 23/84
[58] Field of Search............. 252/477 Q, 465, 466 J, 252/464, 466 B; 423/213.2, 213.5; 75/134 C, 139, 144

[56] References Cited
UNITED STATES PATENTS

| | | | |
|---|---|---|---|
| 2,673,189 | 3/1954 | Reynolds et al. | 252/477 Q |
| 3,565,574 | 2/1971 | Kearby et al. | 252/474 X |
| 3,712,856 | 1/1973 | Betz | 252/477 Q |
| 3,773,894 | 11/1973 | Bernstein et al. | 423/213.5 |

FOREIGN PATENTS OR APPLICATIONS

527,088  10/1940  United Kingdom............ 252/477 Q

*Primary Examiner*—W. J. Shine
*Attorney, Agent, or Firm*—Farley, Forster and Farley

[57] ABSTRACT

Exhaust gas cleaning catalysts are produced by alloying copper and aluminum with at least one of the elements, nickel and chromium, and eluting by alkali or acid means aluminum from the cooled alloy surface. Small amounts of other metals from the fourth or fifth period V~VIII groups, may be added to the catalysts by alloying, or by impregnation, for enhanced catalytic properties. The catalysts exhibit improved reduction of NO and oxidation of CO in an exhaust gas stream, in the presence of Pb, $SO_2$, moisture and hydrocarbons (H.C) and at relatively low temperatures.

16 Claims, 13 Drawing Figures

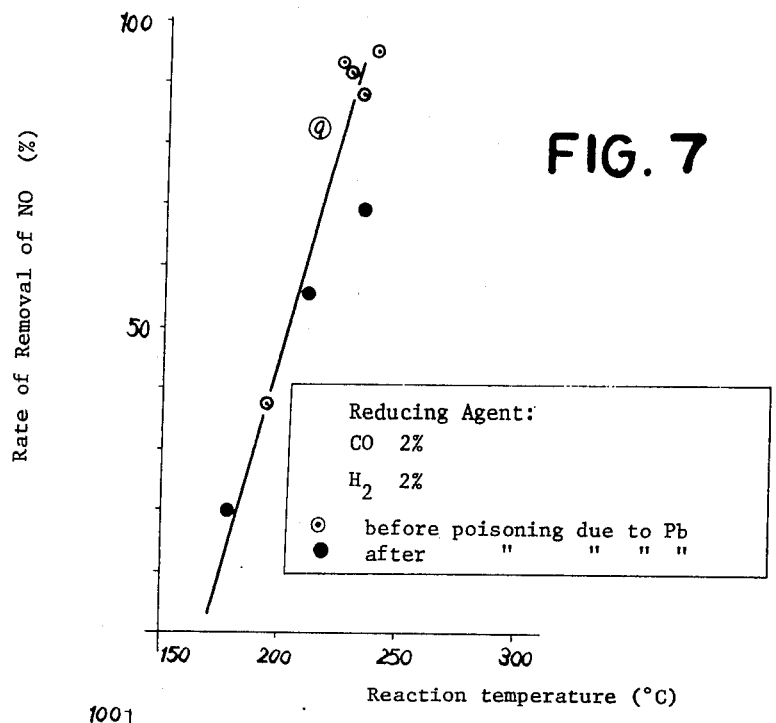
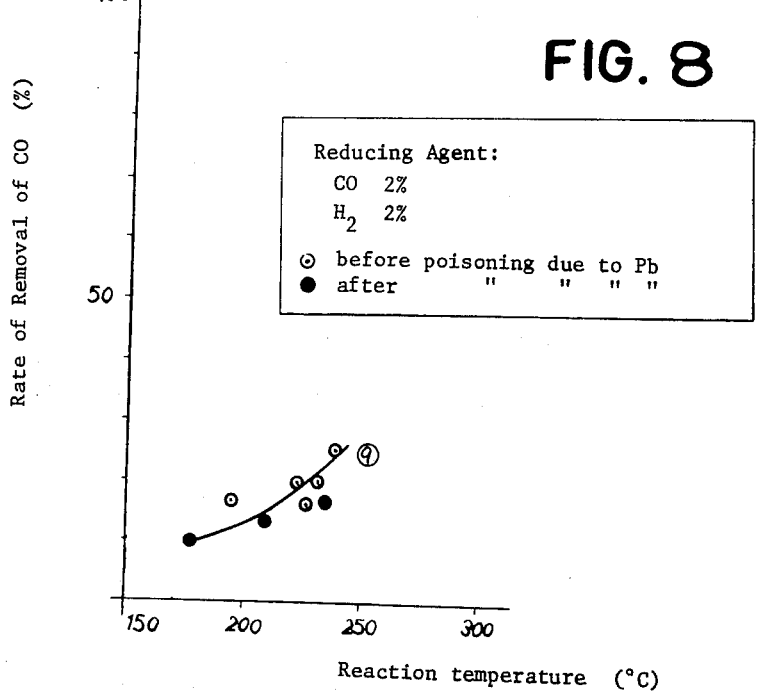

EXHAUST GAS CLEANING CATALYSTS AND METHOD OF PRODUCING SAME

SUMMARY OF THE INVENTION

The present invention relates to an exhaust gas cleaning catalyst. Recently in connection with problems of air pollution there has been a desire for efficient cleaning of various exhaust gases, including boiler exhaust gas, nitric acid plant exhaust gas and automobile exhaust gas, that is, exhaust gases which contain one or more of such harmful things as $SO_2$, NOx, and CO.

The present invention provides a catalyst for converting NOx and CO in said exhaust gases into harmless $N_2$ and $CO_2$.

Generally, this type of catalyst must be capable of enhancing the following reactions.

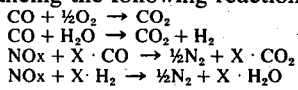

However, $H_2$, which is produced by the reaction, simultaneously produces $NH_3$. Since the production of $NH_3$ is not in accord with the object of this type of reaction, it must be fully suppressed in terms of quantity.

Further, an exhaust gas cleaning catalyst that enhances the reaction $SO_2 + 2CO \rightarrow S + 2CO_2$, would be more effective.

A principal object of the present invention is to provide a method of producing an exhaust gas cleaning catalyst which can effectively carry out the cleaning reaction of said exhaust gases with due consideration for reaction temperature.

According to the invention, an exhaust gas cleaning catalyst is produced by using Al and Cu as main components, adding at least one of the elements Ni and Cr to produce an alloy, and eluting Al from the surface of said alloy by acid or alkali means.

The catalysts of the invention have a wide range of application, therefore the concentrations of the components must be determined according to the working conditions and objects of use.

Thus, the composition of the catalyst must be determined essentially by the following factors:
1. Moisture concentration in a gas to be cleaned;
2. Presence or absence of Pb, SO and hydrocarbons (H·C) in the gas;
3. Nature of the intended reaction (oxidation reaction of CO or reduction reaction of NOx);
4. Nature of the reducing agent, in the case of the reduction reaction of NOx;
5. Temperature used; and,
6. Required mechanical strength and workability.

Further, the configuration of the catalyst is determined essentially by the following factors:
1. Allowable pressure loss:
2. Thermal load (caused essentially by reaction heat);
3. Dynamic characteristics at the time of start up and shut down; and,
4. Amount of gas to be treated.

The relation between the above factors and the present catalyst compositions will now be described.

1. Cu concentration

Cu is important for the activity of the cleaning catalyst, and the presence of 20~50 wt% Cu provides the greatest catalytic activity. However, Cu concentration must be determined by the moisture concentration in the exhaust gas. That is:

When moisture is 0~1 mol%,
   Cu is 10~50 wt%, preferably 20~23 wt%.
When moisture is 1~6 mol%,
   Cu is 20~50 wt%, preferably 28~35 wt%.
When moisture is 6 mol% or above,
   Cu is 30~50 wt%, preferably 35~43 wt%.

If Cu concentration is 55 wt% or above, severe conditions are required for the elution of Al, entailing violent powder falling at the time of packing and during use, so that such concentration is not practical. Further, when the Cu content is 20~23 wt%, if there is no moisture the activity is highest and the surface is stable, but from the standpoint of durability in the presence of water, said range of 20~50 wt%, particularly 35~43 wt% is desired as described above.

2. Ni or Cr concentration

Ni and Cr prevent the deterioration of activity and also preclude poisoning due to Pb and $SO_2$. Further, they improve the heat resistance of the catalyst. However, the increase of Ni and Cr concentration decreases the machinability of the catalyst. The use of Ni gives the catalyst a strong surface, but when more than 10ppm of $SO_2$ exists in the exhaust gas, the use of Ni is not preferred and it is desirable to use Cr.

Further, when the present catalyst is used for the reduction reaction of NOx, either Ni or Cr is used depending upon the reducing agent. Thus, when $H_2$ is used as a reducing agent, Ni is employed whereas Cr is desirable when CO is used.

Although the desirable concentrations of Ni and Cr are determined by the working conditions and the object of use, their approximate values are as follows.
   Cr 0.5~8 wt%, preferably 3~6 wt%
   Ni 1~20 wt%, preferably 3~7 wt%

3. Al concentration

Al may be the remainder of the alloy of Cu, Ni or Cr.

According to the invention, not only is at least one of the elements Ni and Cr added to Al and Cu, but one or more metals (excluding Tc) belonging to the fourth or fifth period, V~VIII groups may also be added.

Thus, some amounts of such metals as V, Mn, Fe, Co, Nb, Mo, Ru, Rh and Pd are added depending upon the object of use and working conditions. These additive metals hardly influence the initial activity of the catalyst, but they influence the poisoning action of $SO_2$ and H·C in an exhaust gas to be treated. Thus, V, Mn and Co serve to decrease the poisoning action of H·C at reaction temperatures. Fe has the main effects of preventing the poisoning by H·C at reaction temperatures of 450°~550°C, preventing thermal deterioration of activity, enabling Cu concentration to be decreased, and enhancing the reaction $CO + \frac{1}{2}O_2 \rightarrow CO_2$. Further, Nb, Mo, Ru, Rh and Pd are particularly effective to decrease the poisoning action of $SO_2$. Therefore, in the case of a catalyst for which the poisoning by $SO_2$ is a problem, it is desirable to add one or more of the elements Nb, Mo, Ru, Rh and Pd. In this case, the reaction rate is decreased, but by also decreasing the amount of Al eluted from the alloy surface, it is possible to avoid the poisoning by $SO_2$ at reaction temperatures of 200°~400°C. Of course, the catalyst of the present invention rarely suffers poisoning with respect to less than 100ppm of $SO_2$ even if particular consideration is not paid to anti-$SO_2$ property, as long as the reaction temperature is above 450°C.

The amounts of these additive metals to be employed must be determined so as to match the object of use and working condition of the catalyst with due consideration for the additional effect obtainable, and the increased manufacturing cost, or effects on the mechanical strength of the catalyst. For example, the addition of 1~3 wt% of Mn is effective against the poisoning by H·C ($C_5$ or above) and at temperatures of 300°C or above, this particular catalyst is not poisoned even by 1,000ppm of H·C. On the other hand, at temperatures of 200°~400°C this particular catalyst is poisoned by $SO_2$. Further, the addition of 3 wt% or more of Mn weakens the mechanical strength of the catalyst and results in increased poisoning by $SO_2$. Thus, with certain additive metals, necessary effects can be obtained, but under certain conditions the catalyst performance can be decreased. Therefore, great care should be given to the selection of additive metals and to the amount employed.

Our experiments have revealed that the intended effects are obtained if V, Mn, Co, Mo and Nb are added in amounts corresponding to 0.1~5.0 wt%, desirably 0.5~2.0 wt%, Ru, Rh and Pd in amounts corresponding to 0.01~0.1 wt%, and Fe in amounts corresponding to 1~20 wt%, desirably 7~15 wt%, as needed.

Typical methods for adding said additive metals are as follows. To an alloy of Al and Cu as main components and including one of the elements Ni and Cr, said additive metals are directly added as components of said alloy. In another method, after Al is eluted from the surface of the alloy to activate the latter, the catalyst alloy surface is impregnated with said additive metals in the form of suitable metal salts and is baked. In a third method the additive metals are added to the catalyst alloy surface by electrolytic and non-electrolytic plating.

The catalyst according to the invention can be shaped to any desired configuration matching the object of use as described above, but the metallic properties (ductility, malleability, etc.) of the catalyst are poor and cold working is difficult. Thus, the catalyst must be in the form of a particulate catalyst prepared by crushing an alloy ingot, a molded catalyst cast in any desired mold, or a suitably hot worked catalyst. These forms, however, have undesirable aspects such as high production costs, an increase in the amounts of catalyst necessary, a decrease in the anti-vibration property due to attrition between particles, and high pressure-losses.

Therefore, it is desirable that after a wire gauze, perforated plate or thin plate of iron, chrome steel, stainless steel or other relatively low-cost, high melting point metal material is worked into a suitable shape, the same be immersed in a molten catalyst alloy to allow the latter to metallurgically adhere to the surface. Further, instead of using the immersion process, said relatively high melting point metal material may be sprayed with a molten catalyst metal.

The catalyst thus produced has sufficient strength even in the form of a plate having a thickness of 0.3~0.5 mm. Further, it may be molded into a complicated structure (e.g. a honeycomb structure). In that case, the catalyst may be made integral with a heat transfer wall to achieve uniform temperature distribution.

Since the catalyst can be formed as thin plate, it is possible to achieve increased effective catalytic surface, anti-vibration property, uniform temperature, decreased pressure loss, etc. Further, the catalyst may be formed as a light-weight catalyst layer or as a reaction vessel.

Preferred embodiments of the invention will now be described with reference to the accompanying drawings.

DESCRIPTION OF THE DRAWINGS

FIGS. 5 through 10 are graphs showing the catalytic performance in a second example of the present inventive catalyst.

DESCRIPTION OF THE PREFERRED EMBODIMENTS

EXAMPLE 1

| Catalyst No. | 1 | 2 | 3 | 4 | 5 | 6 |
|---|---|---|---|---|---|---|
| Cu (wt%) | 21.3 | 31.1 | 40.0 | 41.0 | 39.8 | 50.2 |
| Cr (wt%) | 0.5 | 0.5 | 0.8 | 2.3 | 3.9 | 4.5 |
| Al (wt%) | Balance | " | " | " | " | " |

Test catalysts of the above compositions were prepared by melting predetermined amounts of the metals in a crucible, maintaining the temperature at 900°~1,200°C for 30 minutes, subjecting the melt to quick cooling, crushing the solid to 4~6 mesh, immersing the particles in an aqueous solution of 30 wt% caustic soda at 100°C for 5 minutes to elute Al from the surface, washing the catalyst with water, drying it in a $N_2$ atmosphere, and baking it at 200°C in the air.

The experiments were conducted in the following manner.

First, a catalyst of one of the above compositions was put in a stainless steel reaction pipe of $1^B$, and by using packaged gases a reaction gas was synthesized which consisted of

| CO | about | 20 vol% |
| NO | | 650 ppm |
| $O_2$ | | 0.3 vol% |
| $CO_2$ | about | 13.5 vol% |
| $N_2$ | balance | | and to which a predetermined amount of $H_2O$ was added. The gas was passed at specific velocity (SV) of 15,000~20,000 (I/H) and the gas was analyzed before and after the catalyst layer to determine the rates of removal of NO and CO.

Figure 1:
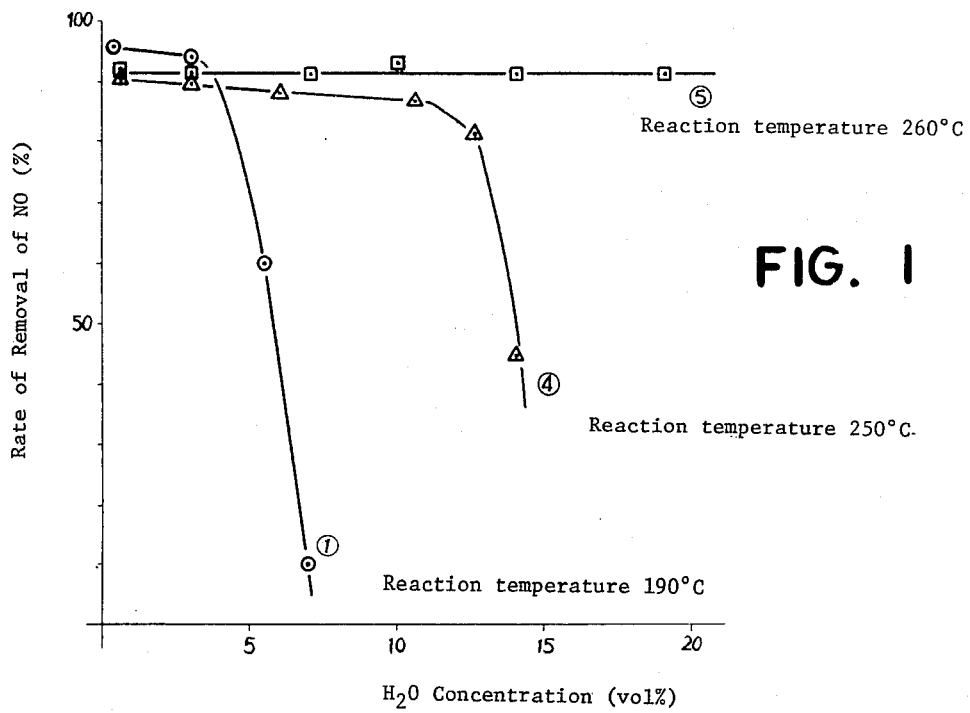
FIGS. 1 through 4 are graphs showing the catalytic performance in a first example of the present inventive catalyst.
Figure 2:
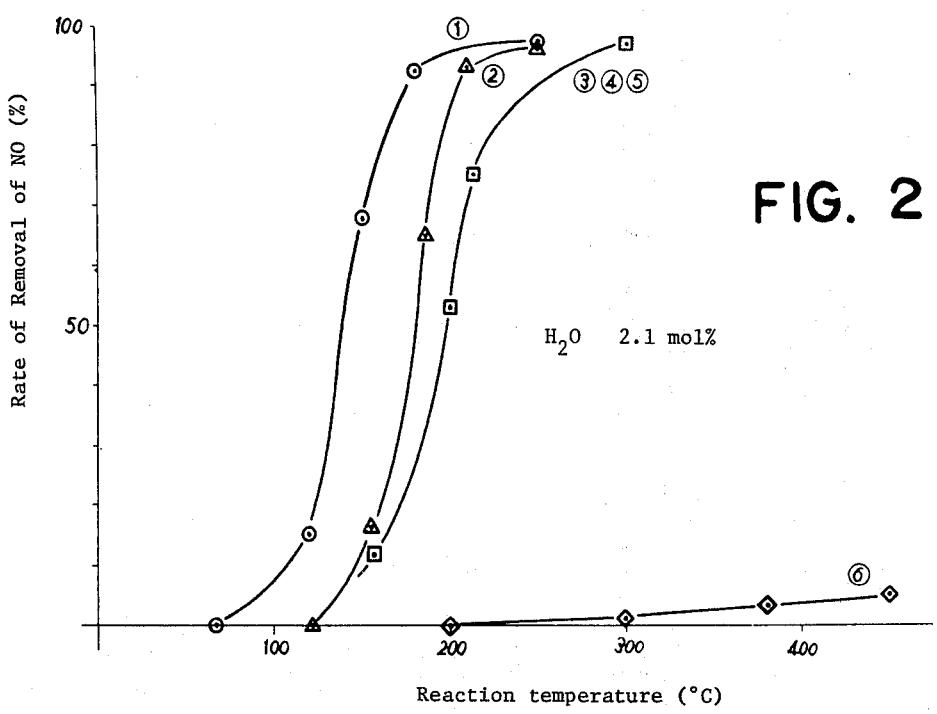
Figure 4:
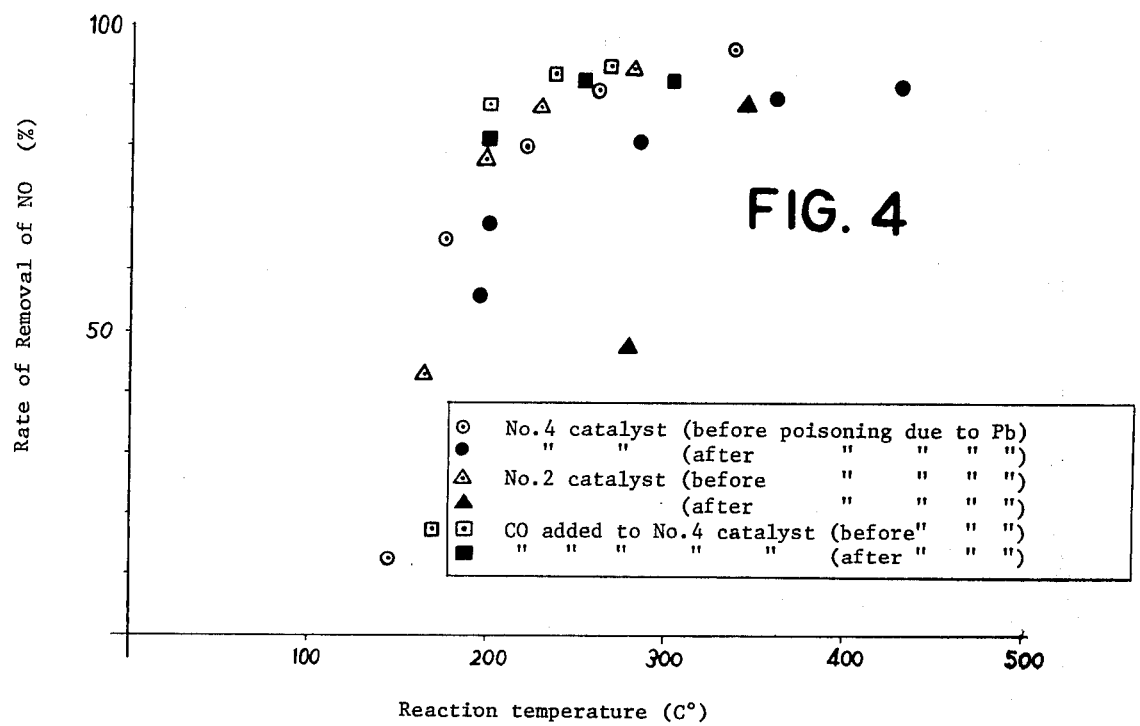
Figure 3:
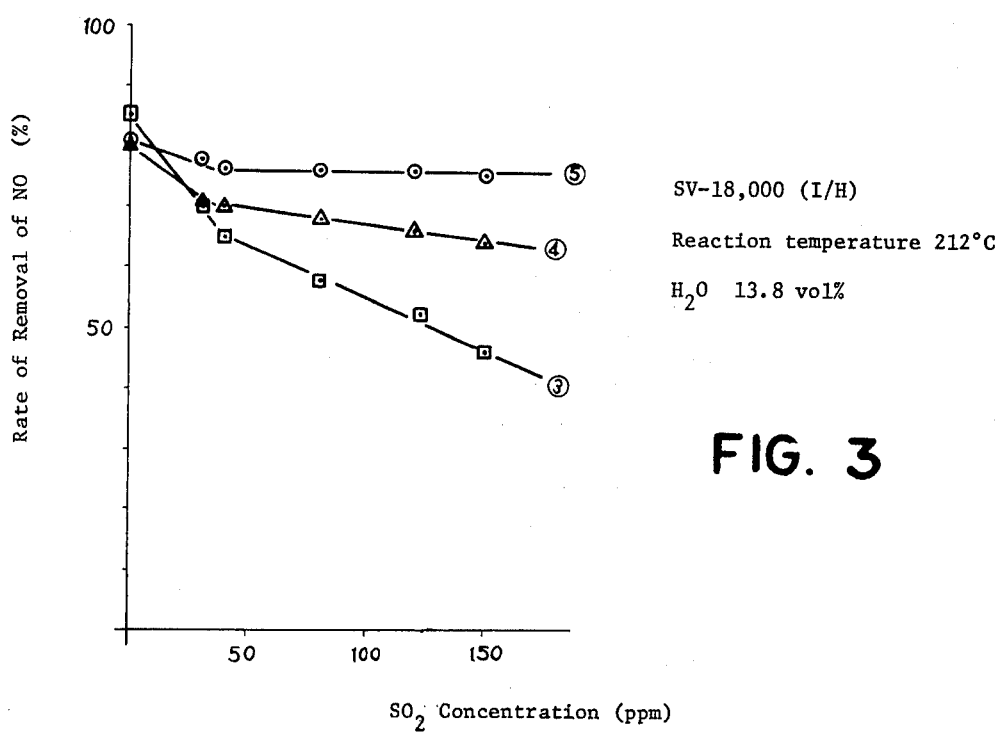

FIGS. 1 through 4 show the activity of the present inventive catalysts in terms of the rate of removal of NO. FIG. 1 shows changes in the rate of removal of NO versus $H_2O$ concentration in said reaction gas with reference to said No. 1, 4 and 5 catalysts. FIG. 2 shows the relation between the reaction temperature and the rate of removal of NO with reference to said individual catalysts of the present invention when said reaction gas with a constant $H_2O$ concentration (2.1mol%) was used. FIG. 3 shows changes in the rate of removal of NO versus $SO_2$ concentration in said reaction gas with reference to No. 3, 4 and 5 catalysts when said reaction gas with a constant $H_2O$ concentration (13.8vol%) was used under fixed conditions of SV-18,000 (I/H) and reaction temperature 212°C. FIG. 4 shows the effects of Pb poisoning on the rate of removal of NO with reference to No. 2 and 4 catalysts and also shows the merit of the addition of CO, in suppressing the rate of removal of NO as a result of Pb poisoning with reference to the No. 4 catalyst.

The effects of $SO_2$ on the rate of removal of NO were investigated by determining the rate of removal of NO by using said reaction gas with $SO_2$ added thereto, in the manner described above. Further, the similar effects of Pb were investigated in such a manner that the catalyst of the invention activated by alkali treatment is impregnated with an aqueous solution of Pb salt to allow the Pb to deposit on the catalyst, and thereafter the rate of removal of NO was measured by a similar method.

In addition, the result of measurement of the rate of removal of CO showed generally the same tendency as the result of measurement of the rate of removal of NO. Further, a reaction gas consisting of

| | | |
|---|---|---|
| CO | about | 5 vol% |
| $O_2$ | about | 20 vol% |
| $N_2$ | | balance | was used and the rate of removal of CO was measured when the reaction $CO + \frac{1}{2}O_2 \rightarrow CO_2$ took place. The result of said measurement showed generally the same tendency.

EXAMPLE 2

| Catalyst No. | 7 | 8 | 9 | 10 | 11 | 12 |
|---|---|---|---|---|---|---|
| Cu (wt%) | 30 | 40 | 40 | 40 | 20 | 20 |
| Ni (wt%) | 20 | 10 | 5 | 1 | 10 | 5 |
| Al (wt%) | Balance | '' | '' | '' | '' | '' |

The No. 7~12 catalysts above were prepared by producing a catalyst alloy from predetermined amounts of metals in the same manner as in Example 1, crushing it to 4~6 mesh and then activating the surfaces of the particles also in the same manner as in Example 1. The reaction experiments were carried out by the same method as described in Example 1.

Figure 5:
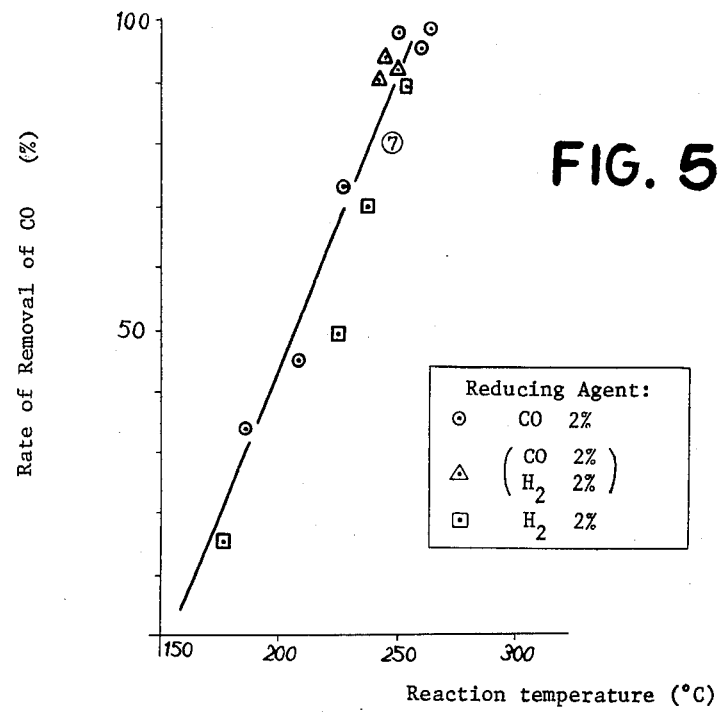
Figure 6:
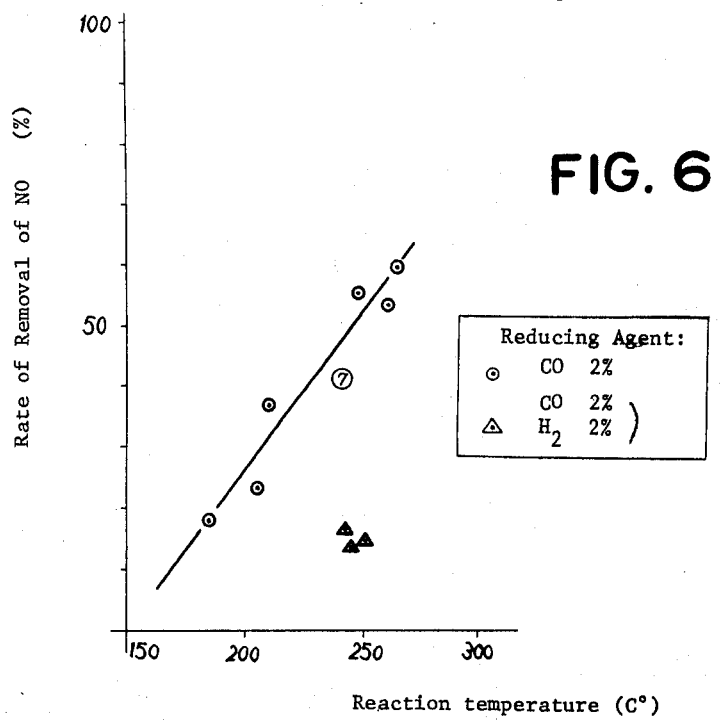

FIG. 5 shows the CO removal performance of the No. 7 catalyst. FIG. 6 shows the NO removal performance of the same catalyst. It is seen from FIG. 5 that either CO or $H_2$ may equally be used as a reducing agent for the reduction-wise removal of CO. It is also seen that a mixture thereof may be used as well. The catalyst accelerates the reaction $2CO + O_2 \rightarrow 2CO_2$ and induces the reaction $CO + H_2O \rightarrow CO_2 + H_2$ in the presence of oxygen, but in the presence of a large amount of $H_2$, the reaction $H_2 + \frac{1}{2}O_2 \rightarrow H_2O$ takes place first, so that the rate of removal of NO is decreased, as can be seen from the rate of removal (the rate of reaction) of NO in FIG. 6.

In the experiment using the No. 9 catalyst, the rates of reaction (the rates of removal) of NO and CO with respect to an exhaust gas containing 15 vol% $H_2O$ and 30 ppm $SO_2$ were as shown in FIGS. 7 and 8, respectively. The performance of this catalyst as impregnated with an aqueous solution of Pb $(NO_3)_2$ so that it is fully poisoned by Pb, is indicated by the dot ( ● ) marks. It is seen from these graphs that this catalyst is hardly poisoned by Pb at temperatures below 200°C. Further, in comparison with the No. 7 catalyst having 20 wt% Ni, the Ni concentration does not influence the reduction of NO.

Figure 9:
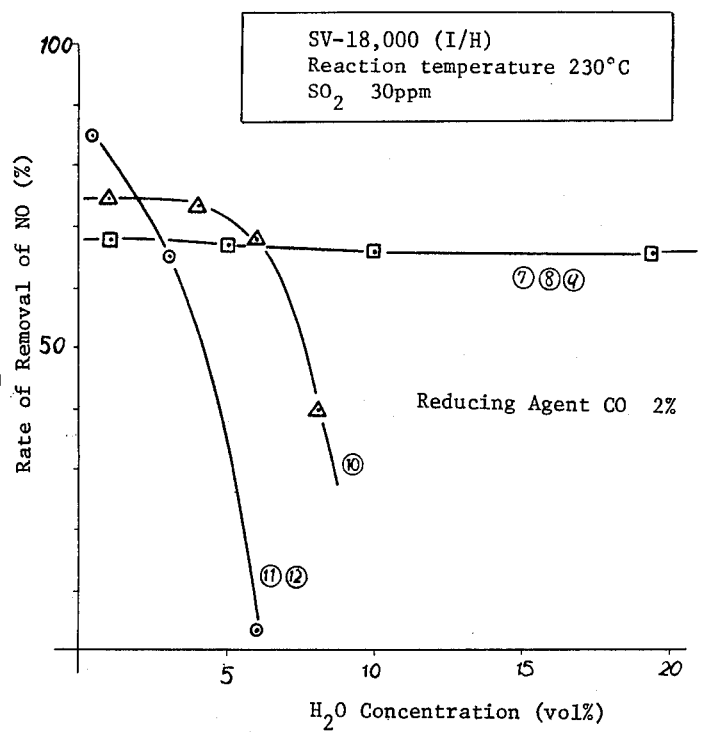
Figure 10:
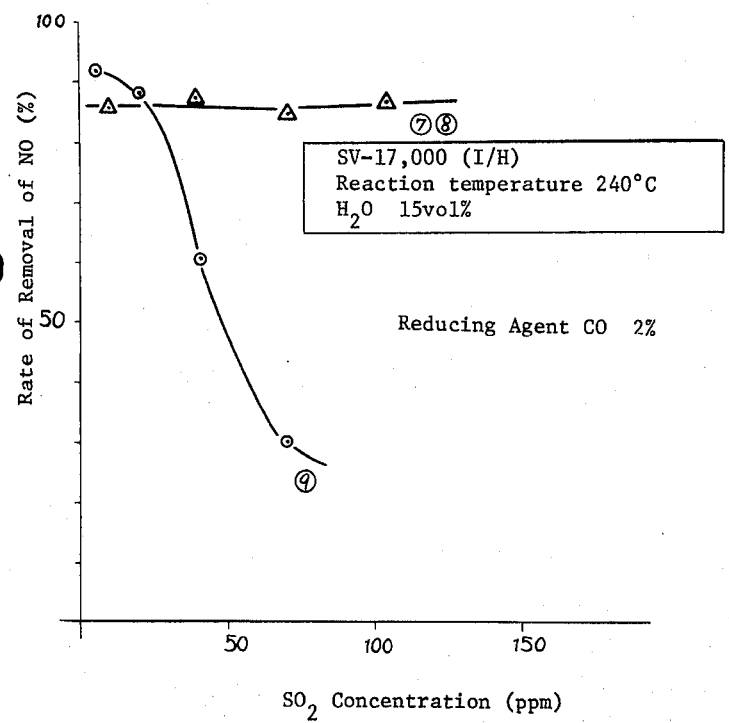

FIG. 9 shows the effects of water on the present catalysts while FIG. 10 shows the effects of $SO_2$ on the present catalysts, in terms of the rate of removal of NO for No. 7~12 catalysts. Further, in the case of the oxidation reaction of CO in the presence of excessive oxygen, the present catalysts exhibit substantially the same tendency.

The catalyst produced from an alloy of Al, Cu and Ni and by eluting Al with alkali according to the present invention exhibits high catalytic activity with respect to the reduction of NO and the oxidation of CO.

* In the case of the reduction of NO:

The rate of reaction (the rate of removal of NO) is greater than 90% at 250°C and SV-16,000/H.

* In the case of the oxidation of CO:

The rate of reaction (the rate of removal of CO) is greater than 20% at 300°C and SV-15,000/H.

In the case of reduction of NO, the evolution of $NH_3$ can be controlled to be less than 30 ppm and either CO or $H_2$ may be used as a reducing agent.

EXAMPLE 3

In this example, the basic catalyst of the present invention, prepared by crushing a catalyst alloy consisting of 40 wt% Cu, 3 wt% Cr and the balance Al to 4~6 mesh and immersing the particles in 30 wt% caustic soda at 100°C for 5 minutes to elute Al from the surface, is compared with improved catalysts, prepared by depositing additive metals to be later described on the surface of said basic catalyst by the impregnation process, with respect to the rate of removal of NO. The results are shown in the following table.

The individual additive metals are indicated within parentheses and the amount added is indicated with respect to the intended element alone. Further, the results of measurement in the rows indicated with (0.5, 1.0, 5.0) and (0.05, 0.1) as amounts added show the average values since there were almost no changes in the results of measurement even if amounts added are changed in that manner. Further, the reaction gases II, III and IV are the basic reaction gas used in Example 1 plus 30ppm of $SO_2$, 800ppm of benzene, and 800ppm of N-hexane, respectively, and the measured values indicate the rates of removal of NO five hours after the initiation of the experiment (the reaction temperature is 300°C.)

In the Examples, alkali treatment using caustic soda was utilized to activate the catalyst by eluting the Al from the catalyst alloy surface, but it is also possible to employ acid treatment using, e.g., acetic acid. To describe an example of acid treatment, a catalyst alloy consisting of 29.6 wt% Cu, 1.4 wt% Cr and the balance Al was crushed to 4~6 mesh and immersed in an aqueous solution of 10% acetic acid at ordinary temperature for 1 minute, washed with water, dried and baked at 250°C. The activity of the catalyst thus obtained was such that the rate of removal of NO attained thereby was 76% at a reaction temperature of 250°C.

| Catalyst No. | Additive metal element (Form in which it is added) | Amount added (wt%) | Rate of removal of NO (%) | | | |
|---|---|---|---|---|---|---|
| | | | I Basic reaction gas | II $SO_2$ added (30ppm) | III Benzene added (800ppm) | IV N-hexane added (800ppm) |
| | Without additives (Basic catalyst) | | 81 | 42 | 31 | 32 |
| 13 | V ($NH_4VO_3$) | 0.5,1.0,5.0 / 0.1 | 70 / 70 | 42 / 40 | 63 / 60 | 65 / 61 |
| 14 | Mn ($MnCO_3 3H_2O$) | 0.5,1.0,5.0 / 0.1 | 73 / 73 | 40 / 40 | 60 / 55 | 60 / 58 |
| 15 | Co ($Co(NO_3)_2 6H_2O$) | 0.5,1.0,5.0 / 0.1 | 70 / 70 | 35 / 38 | 50 / 46 | 55 / 51 |
| 16 | Mo ($(NH_4)_2MoO_4$) | 0.5,1.0,5.0 / 0.1 | 68 / 68 | 58 / 50 | 50 / 45 | 48 / 42 |
| 17 | Nb ($NbCl_5$) | 0.5,1.0,5.0 / 0.1 | 80 / 80 | 70 / 66 | 67 / 60 | 67 / 67 |
| 18 | Ru ($RuCl_3$) | 0.05,0.1 / 0.01 | 76 / 76 | 73 / 70 | 68 / 67 | 65 / 63 |
| 19 | Rh ($RhCl_3$) | 0.05,0.1 / 0.01 | 90 / 90 | 88 / 85 | 83 / 85 | 85 / 85 |
| 20 | Pd ($PdCl_2 8H_2O$) | 0.05,0.1 / 0.01 | 90 / 90 | 85 / 80 | 92 / 85 | 90 / 85 |

EXAMPLE 4

Figure 11:
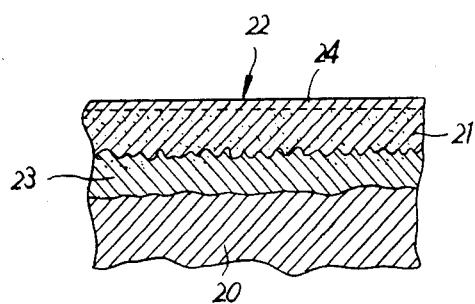
FIG. 11 is a view showing a sectional construction in a fourth example of the present inventive catalyst.

FIG. 11 shows a catalyst 22 comprising the present inventive catalyst alloy 21 carried on a base member 20, composed of a metal having a higher melting point than the catalyst alloy 21, such as iron, chrome steel, stainless steel or other relatively inexpensive high-melting-point metal materials. The reference 23 designates an alloy layer between the base member 20 and the catalyst alloy 21 and the reference 24 designates an active layer from which Al has been eluted.

To describe an example of the production method, predetermined amounts of metals — 38.5 wt% Cu, 3.2 wt% Cr and the balance Al — were melted in a crucible at 1,200°~1,250°C, maintained at said temperature for 30 minutes, and cooled to 900°C. A flux consisting of a mixture of LiCl, KCl and cryolite was melted in another crucible at 550°~600°C. A 30-mesh stainless wire gauze bent to a required shape was immersed in said flux and then in said molten catalyst alloy, withdrawn within 30 minutes and left to stand for cooling. The catalyst structure thus produced was immersed in a 30 wt% caustic soda solution at 100°C for 3 minutes to elute Al, washed with water, dried in $N_2$, and left to stand a whole day and night in the air to oxidize the surface. The catalyst thus obtained was put in a stainless reaction pipe of $1^B$ and a gas consisting of

| | |
|---|---|
| CO | about 2 vol% |
| NO | 650 ppm |
| $O_2$ | 0.3 vol% |
| $CO_2$ | 13 vol% |
| $H_2O$ | 16 vol% |
| $SO_2$ | 40 ppm |
| $N_2$ | balance | was passed therethrough for reaction at 210°C. As a result, a
67% rate of removal of NO and a
52% rate of removal of CO were attained.

For a particulate catalyst of the same composition obtained by crushing the catalyst alloy, the rate of removal of NO was 69% and the rate of removal of CO was 52%.

The alloy deposited on the wire gauze was analyzed, but the elution of the wire gauze metal was negligibly small.

Figure 12:
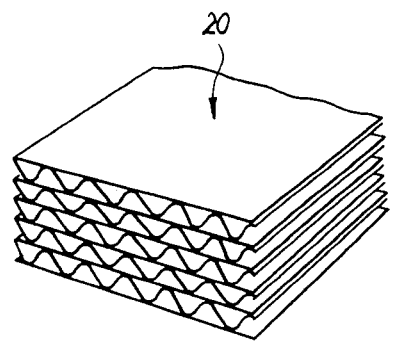
FIGS. 12 and 13 are perspective views showing examples of the shape of a base member used in said fourth example.
Figure 13:
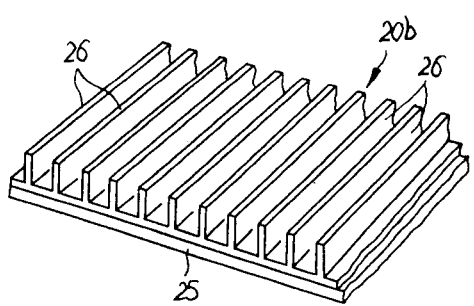

The base member 20 may take any desired form, besides a wire gauze, such as a perforated plate or a thin sheet. Further, the base member 20 may be preformed in a shape desired as a catalyst shape, such as a honey-comb structure 20a shown in FIG. 12 and a structure 20b shown in FIG. 13 intimately contacted with a heat transfer wall 25 and having a number of fins 26. It is then possible to deposit the present inventive catalyst alloy in the manner described above.

We claim:
1. A method of producing an exhaust gas cleaning catalyst comprising the steps of
   forming an alloy composed of 20 to 50% by weight of Cu; at least one of the metals Ni in an amount of 1 to 20% by weight, and Cr in an amount of 0.5 to 8% by weight; and Al as the remaining percent by weight;
   adding at least one additional metal selected from the group consisting of V, Mn, Fe, Co, Nb, Mo, Ru, Rh and Pd; and
   eluting Al from the surface of said alloy to activate the surface of said catalyst.
2. A method of producing an exhaust gas cleaning catalyst according to claim 1 wherein said alloy is applied to a preformed base member consisting of a metal having a higher melting point than said alloy.
3. A method of producing an exhaust gas cleaning catalyst according to claim 2 wherein said alloy is sprayed on said base member.
4. A method of producing an exhaust gas cleaning catalyst according to claim 1 wherein said eluting step is carried out by employing a non-oxidizing acid.
5. A method of producing an exhaust gas cleaning catalyst according to claim 1 wherein said eluting step is carried out by employing an alkali.
6. A method of producing an exhaust gas cleaning catalyst according to claim 1 wherein said additional metal is added in said forming step.
7. A method of producing an exhaust gas cleaning catalyst according to claim 1 wherein said adding step is carried out by applying said additional metal to the surface of said alloy.
8. A method of producing an exhaust gas cleaning catalyst according to claim 7 wherein said additional metal is applied to the eluted surface of said alloy in the form of a salt and said alloy is then baked.

9. A method of producing an exhaust gas cleaning catalyst according to claim 1 wherein said additional metal is employed in the following amounts by weight:

V, Mn, Co, Mo, Nb — 0.1 to 5%;
Ru, Rh, Pd — 0.01 to 0.1%; and,
Fe — 1.0 to 20%.

10. An exhaust gas cleaning catalyst comprising an alloy composed of 20 to 50% by weight of Cu, at least one of the metals Ni in an amount of 1 to 20% by weight and Cr in an amount of 0.5 to 8% by weight, and Al as the remaining percent by weight; said catalyst including at least one additional metal selected from the group consisting of V, Mn, Fe, Co, Nb, Mo, Ru, Rh and Pd; and the surface of said catalyst being activated by the removal of Al therefrom.

11. An exhaust cleaning catalyst according to claim 10 wherein said additional metal is deposited on the surface of the catalyst.

12. An exhaust cleaning catalyst according to claim 10 wherein said additional metal is employed in the following amounts by weight:

V, Mn, Co, Mo, Nb — 0.1 to 5%;
Ru, Rh, Pd — 0.01 to 0.1%; and,
Fe — 1.0 to 20%.

13. An exhaust gas cleaning catalyst according to claim 10 further comprising a base member on which said alloy is carried.

14. An exhaust gas cleaning catalyst according to claim 13 wherein said base member consists of a metal having a higher melting point than said alloy.

15. A method of producing an exhaust gas cleaning catalyst consisting of forming an alloy composed of 20 to 50% by weight of copper; at least one of the metals Ni in an amount of 3 to 7% by weight and Cr in an amount of 0.5 to 85 by weight; and Al as the remaining percent by weight; and eluting Al from the surface of said alloy to activate the surface of said catalyst.

16. An exhaust gas cleaning catalyst comprising an alloy composed of 20 to 50% by weight of copper; at least one of the metals Ni in an amount of 3 to 7% by weight and Cr in an amount of 0.5 to 8% by weight; and Al as the remaining percent by weight; the surface of said alloy being activated by the removal of Al therefrom.

* * * * *

UNITED STATES PATENT AND TRADEMARK OFFICE
CERTIFICATE OF CORRECTION

PATENT NO. : 3,939,097
DATED : February 17, 1976
INVENTOR(S) : So Takeoka, Hideya Inaba and Masayoshi Ichiki It is certified that error appears in the above-identified patent and that said Letters Patent are hereby corrected as shown below:

Column 3, line 66, "as thin plate" should read --as a thin plate--;

Column 7, line 41, "A. 30-mesh" should read --A 30-mesh--;

Column 10, line 12, "85" should read --8%--.

Signed and Sealed this

Thirteenth Day of July 1976

[SEAL]

Attest:

RUTH C. MASON
*Attesting Officer*

C. MARSHALL DANN
*Commissioner of Patents and Trademarks*